United States Patent
Lewis (10) Patent No.: US 8,117,616 B2
(45) Date of Patent: Feb. 14, 2012

(54) PREVENTING DEADLOCKS

(75) Inventor: Russell Lee Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 11/621,499

(22) Filed: Jan. 9, 2007

(65) Prior Publication Data

US 2008/0168448 A1    Jul. 10, 2008

(51) Int. Cl.
*G06F 9/46* (2006.01)
*G06F 12/00* (2006.01)

(52) U.S. Cl. ........ 718/102; 718/100; 718/101; 718/104; 710/200; 710/241; 710/242; 710/243

(58) Field of Classification Search .................. 718/102, 718/100, 101, 104; 710/200, 240
See application file for complete search history.

(56) References Cited

U.S. PATENT DOCUMENTS

| | | | |
|---|---|---|---|
| 5,551,046 A * | 8/1996 | Mohan et al. ........................ 1/1 |
| 6,119,115 A * | 9/2000 | Barr ...................................... 1/1 |
| 6,173,442 B1 | 1/2001 | Agesen et al. |
| 6,314,563 B1 | 11/2001 | Agesen et al. |
| 6,581,205 B1 * | 6/2003 | Cochrane et al. ............. 717/140 |
| 6,631,009 B1 * | 10/2003 | Thomas et al. ............... 358/1.15 |
| 6,665,814 B2 * | 12/2003 | Hobson et al. .................. 714/16 |
| 6,735,760 B1 | 5/2004 | Dice |
| 6,883,026 B1 | 4/2005 | Onodera et al. |
| 7,073,176 B1 * | 7/2006 | Simmons et al. ............. 718/104 |
| 2003/0105796 A1 * | 6/2003 | Sandri et al. .................. 709/104 |
| 2004/0103110 A1 * | 5/2004 | Goode et al. .................. 707/101 |
| 2006/0168585 A1 * | 7/2006 | Grcevski et al. ............. 718/104 |
| 2008/0065644 A1 * | 3/2008 | Pasupuleti et al. ............. 707/10 |
| 2008/0209422 A1 * | 8/2008 | Coha ............................ 718/102 |
| 2009/0235002 A1 * | 9/2009 | Nir-Buchbinder et al. ... 710/240 |

OTHER PUBLICATIONS

Online sql newsgroups "Update Lock (Preventing Deadlocks)" Apr. 6, 2006, pp. 1-4 http://www.sqlnewsgroups.net/sqlserver/t13383-update-lock-preventing-deadlock.aspx.*

"Deadlock", [online], 2007, pp. 1-3. [Retrieved on Jan. 9, 2007]. Retrieved from the Internet at URL: <http://www2.cs.uregina.ca/~hamilton/courses/330/notes/synchro/node4.html >.

* cited by examiner

*Primary Examiner* — Emerson Puente
*Assistant Examiner* — Willy W Huaracha
(74) *Attorney, Agent, or Firm* — Rabindranath Dutta; Konrad Raynes & Victor LLP (57) ABSTRACT

A deadlock prevention mode indicator is provided, wherein the deadlock prevention mode indicator is a lock that can be held in a shared mode or in an exclusive mode by one or more of a plurality of threads, and wherein the plurality of threads can cause deadlocks while acquiring a plurality of data locks. An execution of the plurality of threads is serialized by allowing a data lock to be acquired by a thread in response to the thread holding the deadlock prevention mode indicator, wherein serializing the plurality of threads avoids any deadlock from occurring.

12 Claims, 9 Drawing Sheets

PREVENTING DEADLOCKS

BACKGROUND

1. Field

The disclosure relates to a method, system, and article of manufacture for preventing deadlocks.

2. Background

A set of threads may be referred to as being deadlocked if each thread in the set waits for an event that only another thread in the set can cause. When a plurality of threads race for a plurality of locks, deadlock conditions may exist. Certain implementations include special mechanisms, such as mechanisms to gain the locks in a specific order, that can prevent deadlock conditions from occurring. However, such mechanisms can be impractical to employ in certain situations.

Fine grained locks allow for high concurrency, making such fine grained locks a requirement for many highly scalable systems. However, fine grained locks may be difficult to use because of the danger of the occurrence of deadlocks. Certain implementations provide ways to ensure that deadlocks are avoided, but such implementations may put restrictions on how or in what order locks can be achieved, or may require complex try-and-backoff implementations.

One mechanism to prevent deadlock is to define an order in which locks are to be attempted by threads. Any thread can acquire as many of the locks as the thread desires, provided that the thread always acquire in the defined order. This prevents deadlock because it removes the circular wait condition for deadlock. Each thread, if the thread happens to block, is blocking on some other thread which is continuing processing. Ordering mechanisms work well if a thread is aware of the locks that are going to be needed ahead of time, and can acquire the locks in the right order. Ordering mechanisms fail if it is impossible or inconvenient to acquire the locks in the right order.

In try-and-backoff implementations a thread makes a non-blocking attempt on a lock. If the lock is available, the thread acquires it immediately and continues on; if not, then the thread is returned an error. Anytime the thread fails a "try," the thread rewinds itself, unlocking any locks that the thread already has, and then starts over. This prevents deadlock because it removes the hold and wait condition. A system can be devised with a thread that never blocks while holding another lock.

Sometimes, ordering mechanisms are combined with try-and-backoff implementations. The system is allowed to acquire the locks in any order, and blocking lock operations can be used whenever locks are being gained in order. However, a thread uses "try" (i.e., a non blocking lock attempt) anytime that that the thread attempts a lock that is out of order. If the thread fails a "try", then the thread unwinds, releases all of the locks that the thread had gained, and tries again. Sometimes, on the second pass it is possible to gain the locks in the right order, and thus use blocking operations throughout.

Try-and-backoff works well a thread is able to unlock locks if one fails. However, this is often not the case; often, threads perform operations which are hard to undo, and it may be impractical to release all of the locks if one lock fails.

In certain implementations, the locking procedure is made into a critical section. Such implementations use a lock to ensure that there is only one thread performing locks at any given time. A process using such an implementation would perform its work as follows:
1. Lock the lock-attempt-lock;
2. Gain various data locks;
3. Unlock the lock-attempt-lock;
4. Perform work; and
5. Unlock the data locks.

Such implementations prevents deadlock, since there is only one process performing locks at any given moment. It allows for fine grained data locks, which means that there can be a lot of concurrency in data access. Moreover, if it so happens that there is not much contention for these data locks, then the system will have high efficiency. Threads will only hold the lock-attempt-lock for short periods, so there will be little contention. However, such implementations do cause serious contention in some circumstances. If a thread gains the lock-attempt-lock and then immediately blocks on some other lock, then no other thread will be able to gain any locks in the system until the data lock becomes available. In the worst case, this means that the interaction of two threads (a first thread, which holds the data lock for a long time, and a second thread, which blocks on the lock) can stop all future threads from gaining any locks.

SUMMARY OF THE PREFERRED EMBODIMENTS

A deadlock prevention mode indicator is provided, wherein the deadlock prevention mode indicator is a lock that can be held in a shared mode or in an exclusive mode by one or more of a plurality of threads, and wherein the plurality of threads can cause deadlocks while acquiring a plurality of data locks. An execution of the plurality of threads is serialized by allowing a data lock to be acquired by a thread in response to the thread holding the deadlock prevention mode indicator, wherein serializing the plurality of threads avoids any deadlock from occurring.

In further embodiments, the serializing further comprises, selecting, for a set of data locks, a definition of safety, wherein in accordance with the definition of safety any number of safe threads could attempt to gain data locks included in the set of data locks without there being any chance of a deadlock. A determination is made by the thread, whether the thread is a safe thread or a dangerous thread, wherein the safe thread can be proven to conform to the definition of safety selected, wherein an acquisition of at least one selected data lock by a dangerous thread may lead to a deadlock. An acquisition is made by the thread of the deadlock prevention mode indicator in the shared mode, in response to determining that the thread is a safe thread. An acquisition is made by the thread of the deadlock prevention mode indicator in an exclusive mode, in response to determining that the thread is a dangerous thread.

In still further embodiments, the deadlock prevention mode indicator is downgraded from the exclusive mode to the shared mode, in response to determining from downgrading rules that the deadlock prevention mode indicator can be safely downgraded, wherein the downgrading further comprises atomically moving the deadlock prevention mode indicator from the exclusive mode to the shared mode.

In additional embodiments, safe threads are those threads that never block while attempting an out of order data lock, and wherein dangerous threads may block while attempting an out of order data lock.

In yet additional embodiments, safe threads are those threads that never attempt an exclusive lock on a data lock, and wherein dangerous threads are those threads that attempt any exclusive lock on a data lock.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments prevent deadlocks by defining a "metalock", also referred to as a deadlock prevention mode indicator, which is a lock that does not protect any data. The metalock serializes threads as the threads attempt to gain locks. Threads which conform to a standard of safety gain this metalock in shared mode. Thus, many such threads may be performing locks at the same time. A thread which cannot conform to the safety standard holds the metalock in exclusive mode while the thread performs its locks, thus ensuring that the thread is the only thread attempting locks during a window of time. Thus, deadlock is prevented throughout the system, while high concurrency is maintained.

Figure 1:
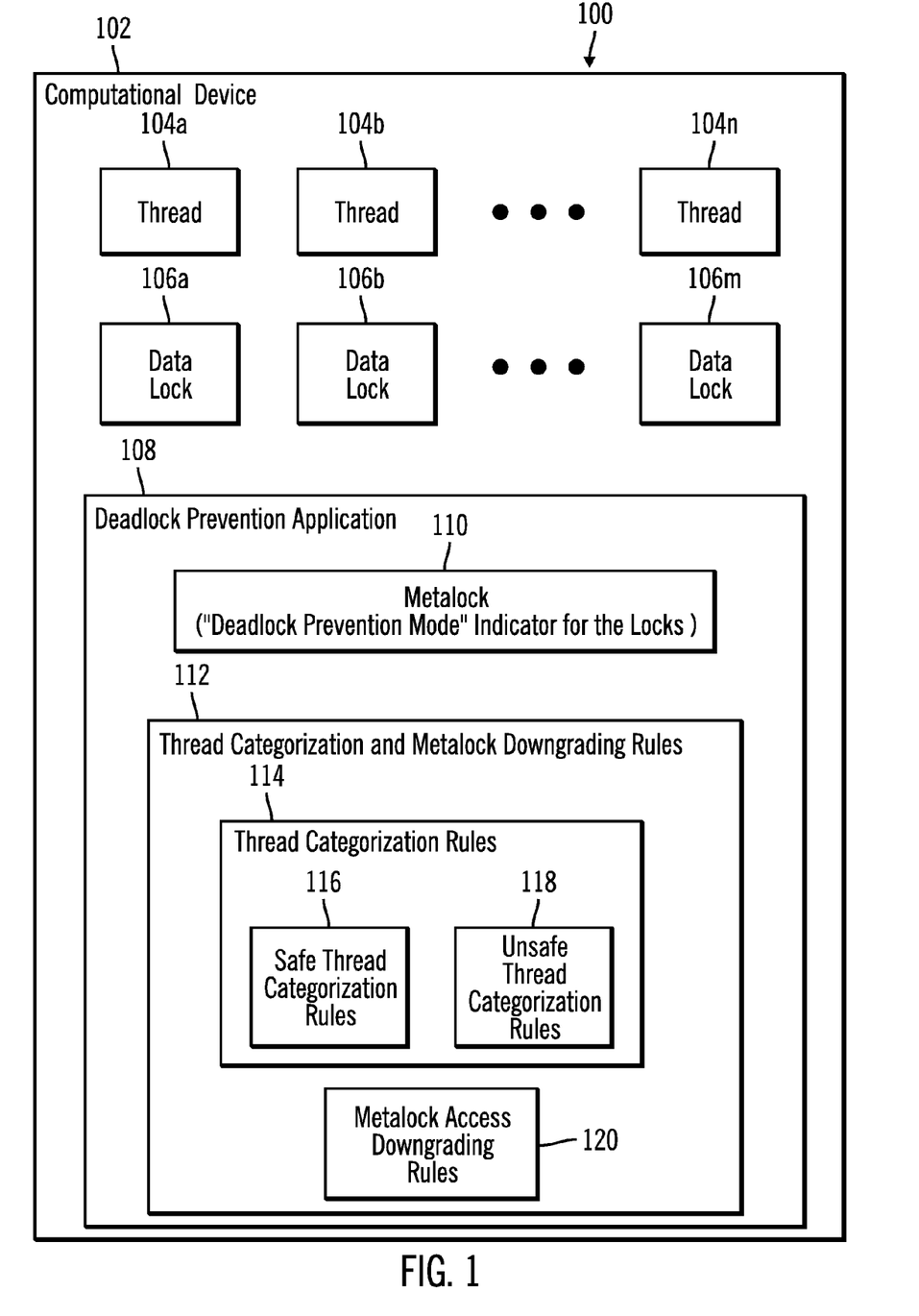
FIG. 1 illustrates a block diagram of a computing environment, in accordance with certain embodiments.

FIG. 1 illustrates a block diagram of a computing environment 100 that includes a computational device 102, in accordance with certain embodiments. The computational device 102 may comprise any suitable computational platform, including those presently known in the art, such as, a personal computer, a workstation, a mainframe, a midrange computer, a network appliance, a palm top computer, a telephony device, a blade computer, a hand held computer, etc.

A plurality of threads 104a, 104b, . . . , 104n may execute within the computational device 102, wherein a thread may comprise a sequence of instructions under execution by a processor (not shown in FIG. 1) included in the computational device 102. A plurality of data locks 106a, 106b, . . . 106m are also included in the computational device 102, wherein the plurality of data locks 106a . . . 106m may be implemented via any data structures known in the art. A data lock such as data lock 106a, may represent a resource, such as a variable, an object, a device, etc., that needs to be locked by a thread included in the plurality of threads 104a . . . 104n.

The computational device 102 includes a deadlock prevention application 108, wherein the deadlock prevention application 108 may be implemented in software, hardware, firmware or any combination thereof. The deadlock prevention application 108 executes in the computational device 102 to prevent deadlocks from occurring while the plurality of threads 104a . . . 104n execute in the computational device 102.

The deadlock prevention application 108 includes a metalock 110, also referred to as a deadlock prevention mode indicator, and thread categorization and metalock downgrading rules 112. The metalock 110, i.e., the deadlock prevention mode indicator, is a lock that can be held in a shared mode or in an exclusive mode by one or more of a plurality of threads 104a . . . 104n, wherein the plurality of threads can cause deadlocks while acquiring a plurality of data locks 106a . . . 106m. The deadlock prevention application 108 serializes the execution of the plurality of threads 104a . . . 104n, by allowing a data lock, such as data lock 106a, to be acquired by a thread in response to the thread holding the metalock 110, wherein serializing the plurality of threads avoids any deadlock from occurring.

The thread categorization and metalock downgrading rules 112 define a set of thread categorization rules 114 that include safe thread categorization rules 116 and dangerous thread categorization rules 118. In certain embodiments, safe threads are those threads that never block while attempting an out of order data lock, whereas dangerous threads may block while attempting an out of order data lock. In other embodiments, safe threads and dangerous threads may be defined differently. The thread categorization and metalock downgrading rules 112 are rules that are related to the downgrading of the status of selected threads with regard to the exclusive or shared access of the selected threads to the metalock.

Figure 2:
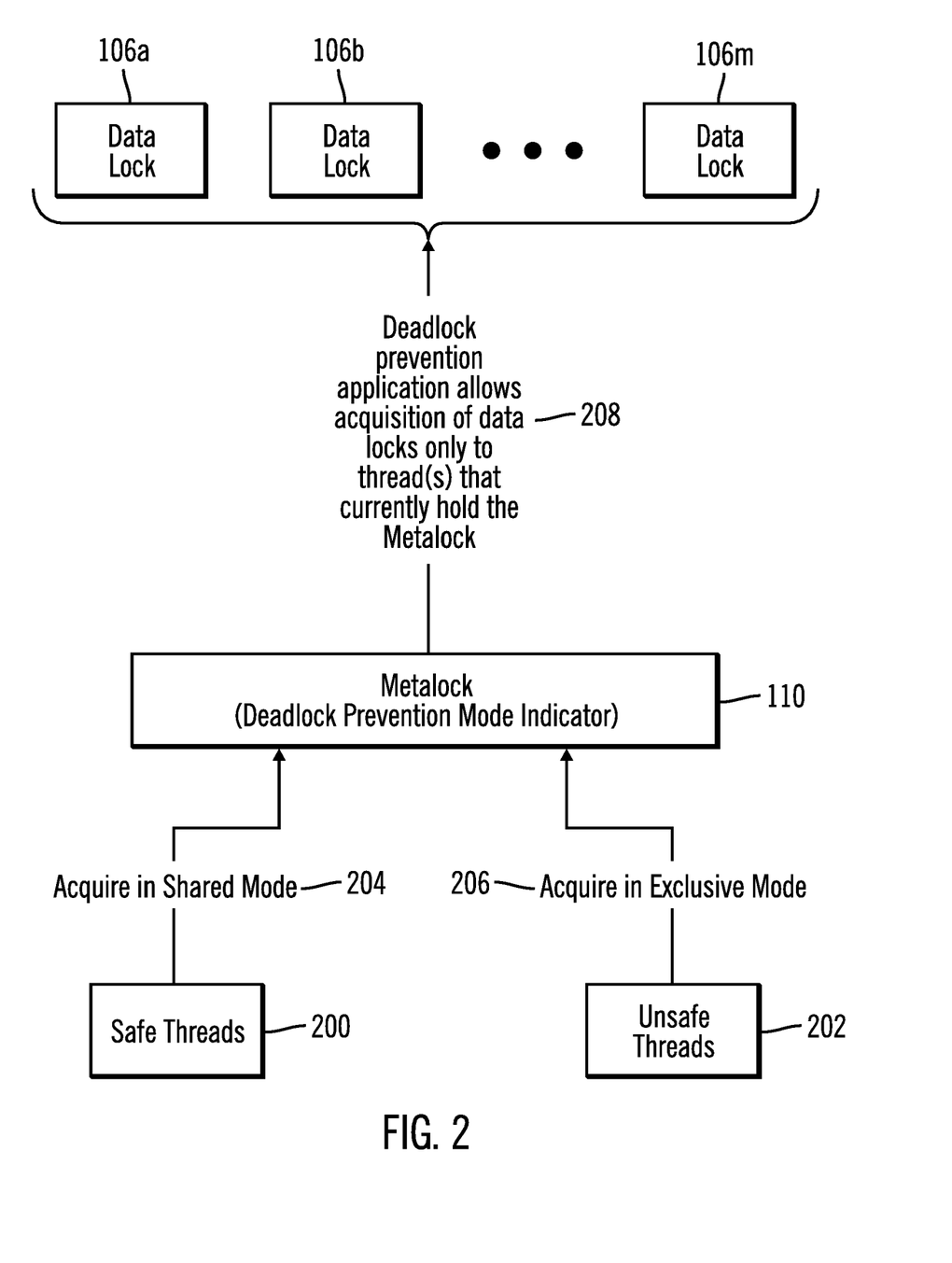
FIG. 2 illustrates a block diagram that shows interactions between threads, metalocks, and data locks, in accordance with certain embodiments.

FIG. 2 illustrates a block diagram that shows interactions between threads, metalocks 110, and data locks 106a . . . 108m, in accordance with certain embodiments.

In certain embodiments, the deadlock prevention application 108 causes the categorization of the threads 104a . . . 104n into safe threads 200 and dangerous threads 202, where safe threads 200 cannot cause deadlocks and dangerous threads 202 may cause deadlocks. The deadlock prevention application 108 causes the safe threads 200 to acquire the metalock 110 in shared mode (reference numeral 204), and causes the dangerous threads 202 to acquire the metalock 110 in exclusive mode (reference numeral 206). In shared mode more than one thread may hold the metalock 110 at tire same time, whereas in exclusive mode only a single thread can hold the metalock 110 at any instant of time. The deadlock prevention application 108 prevents deadlock by allowing the acquisition of data locks 106a . . . 106m only to threads that currently hold the metalock 110 (reference numeral 208).

Therefore, FIG. 2 illustrates certain embodiments in which safe threads 200 can hold the metalock in a shared mode, whereas dangerous threads 202 can hold the metalock only in an exclusive mode. Deadlock is prevented by allowing data locks to be acquired only by those threads that currently hold the metalock 110. As a result, a dangerous thread, i.e., a thread that can cause deadlock, is allowed to access the data locks 106a . . . 106m when the dangerous thread holds the metalock 110 exclusively.

Figure 3:
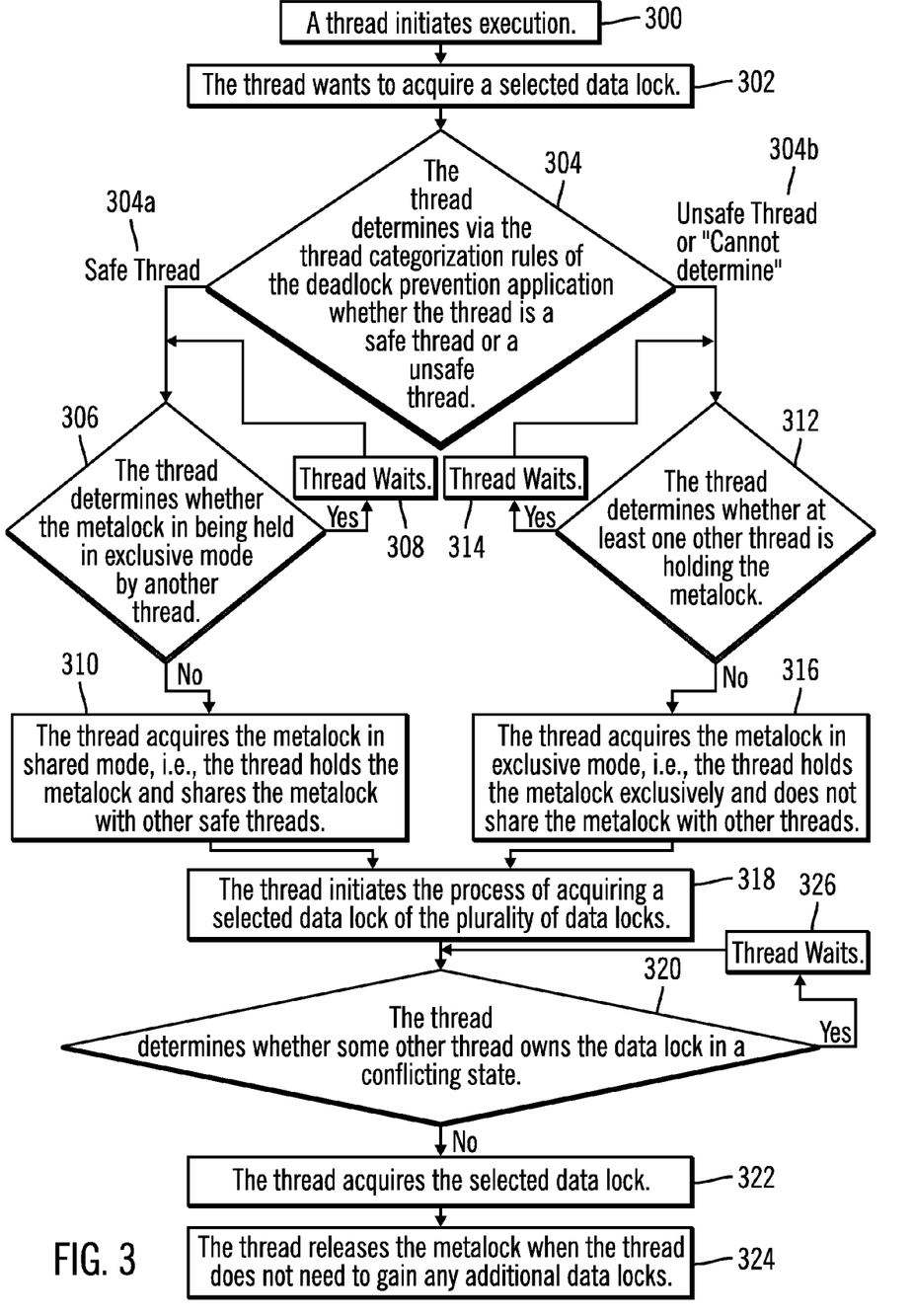
FIG. 3 illustrates operations for preventing deadlocks, in accordance with certain embodiments.

FIG. 3 illustrates operations for preventing deadlocks, in accordance with certain embodiments. The operations illustrated in FIG. 3 may be implemented by the deadlock prevention application 108 in the computing device 102.

Control starts at block 300 where a thread, such as thread 104a, initiates execution, wherein the thread 104a wants to acquire (at block 302) a selected data lock, such as data lock 106a. Control proceeds to block 304, where the thread 104a determines via the thread categorization rules 114 of the deadlock prevention application 108 whether the thread is a safe thread 200 or a dangerous thread 202.

If the thread 104a determines (at block 304) that the thread 104a is a safe thread (reference numeral 304a) control proceeds to block 306. At block 306, the thread 104a determines whether the metalock 110 is being held in exclusive mode by another thread. If so, then the thread 104a waits (at block 308) and control again returns to block 306. If not, then the thread 104a acquires (at block 310) the metalock 110 in shared mode, i.e., the thread 104a holds the metalock 110 and shares the metalock 110 with other safe threads.

If at block 304, the thread 104a determines that the thread 104a is a dangerous thread or if the thread 104a cannot determine the type of the thread (reference numeral 304b), then control proceeds to block 312. At block 312, the thread 104a determines whether the metalock 110 is being held by at least one other thread. If so, then the thread 104a waits (at block 314) and control again returns to block 312. If not, the thread 104a acquires (at block 316) the metalock 110 in exclusive mode, i.e., the thread 104a holds the metalock 110 exclusively and does not share the metalock 110 with other threads.

From blocks 310 and 316 control proceeds to block 318 where the thread 104a initiates the process of acquiring a selected data lock 106a of the plurality of data locks 106a ... 106m. The thread 104a determines (at block 320) whether some other thread owns the data lock in a conflicting state, where "conflicting state" would mean either: (1) That the current thread wants a shared lock on the data lock, and some other thread is holding the data lock in exclusive mode; or (2) That the current thread wants an exclusive lock on the data lock, and some other thread is holding any sort of lock on the data lock.

If at block 320, the thread 104a determines that some other thread does not own the data lock in a conflicting state then the thread 104a acquires (at block 322) the selected data lock 106a and releases (at block 324) the metalock 110 when the thread 104a does not need to gain any additional data locks.

If at block 320, the thread 104a determines that some other thread owns the data lock in a conflicting state then the thread waits (at block 326) and control returns to block 320 after the elapse of a period of time.

Therefore, FIG. 3 illustrates certain embodiments for preventing deadlocks by causing safe threads 200 to share the metalock 110 while holding tire metalock 110, and by causing a dangerous thread 202 to exclusively hold the metalock 110, wherein holding the metalock is a prerequisite for acquiring a data lock from the plurality of data locks 106a ... 106m.

Figure 4:
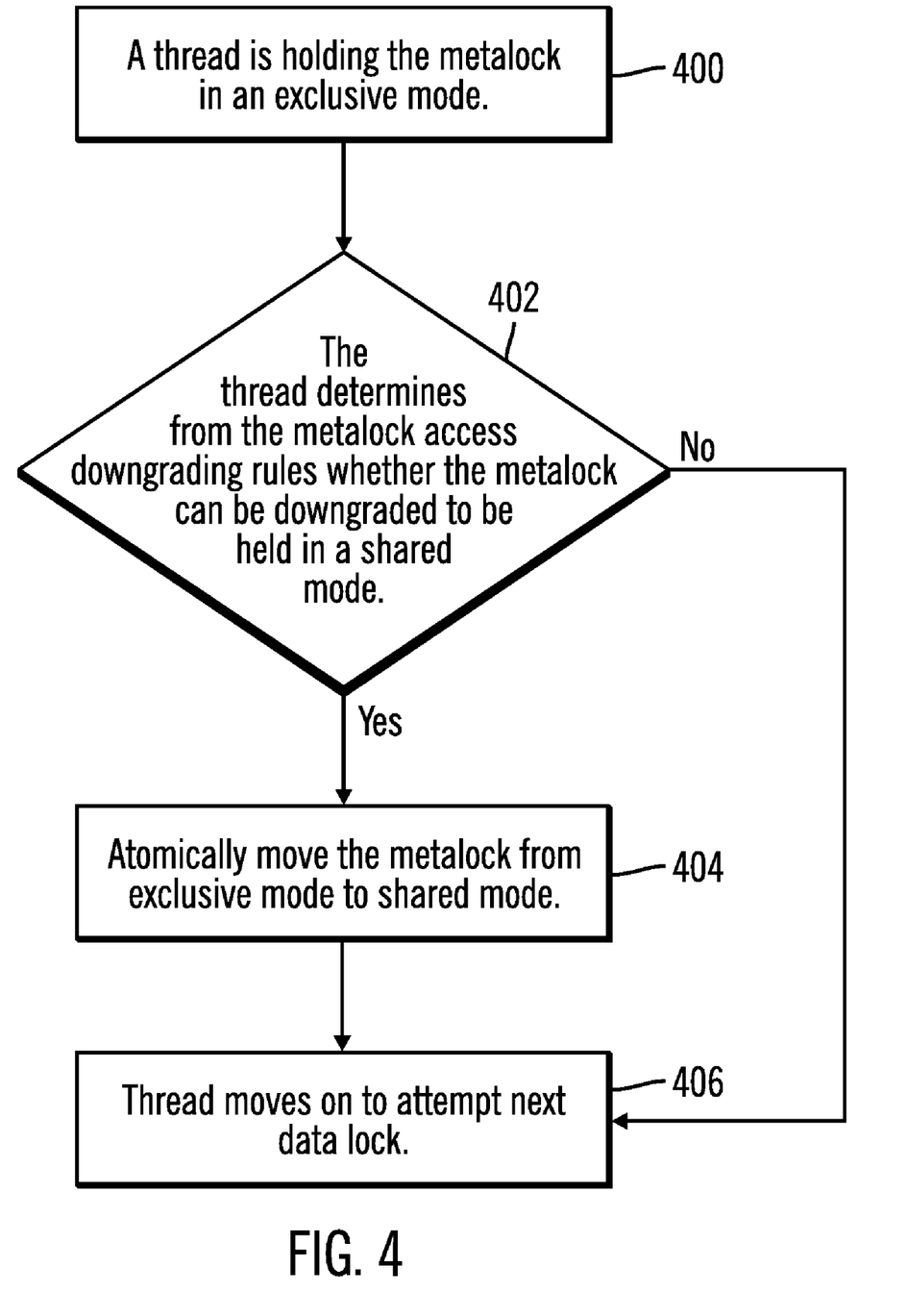
FIG. 4 illustrates operations for downgrading metalocks, in accordance with certain embodiments.

FIG. 4 illustrates operations for downgrading metalocks, in accordance with certain embodiments. The operations illustrated in FIG. 4 may be implemented by the deadlock prevention application 108 in the computing device 102.

Control starts at block 400, where a thread, such as thread 104a, is holding the metalock 110 in an exclusive mode. The thread 104a determines (at block 402) from the metalock access downgrading rules 120 whether the metalock 110 can be downgraded to be held in a shared mode. If the metalock 110 can be downgraded to be held in a shared mode, then the thread 104a atomically moves (at block 404) the metalock 110 from the exclusive mode to the shared mode, and then the thread 104a moves on to attempt (at block 406) the next data lock. If the thread 104a determines (at block 402) from the metalock access downgrading rules 120 that the metalock 110 cannot be downgraded to be held in a shared mode, then control proceeds to block 406 where the thread 104a moves on to attempt the next data lock.

Therefore, FIG. 4 illustrates certain embodiments in which a thread uses the metalock access downgrading rules 120 to determine whether or not to downgrade the metalock 110 from the exclusive mode to tire shared mode.

Figure 5:
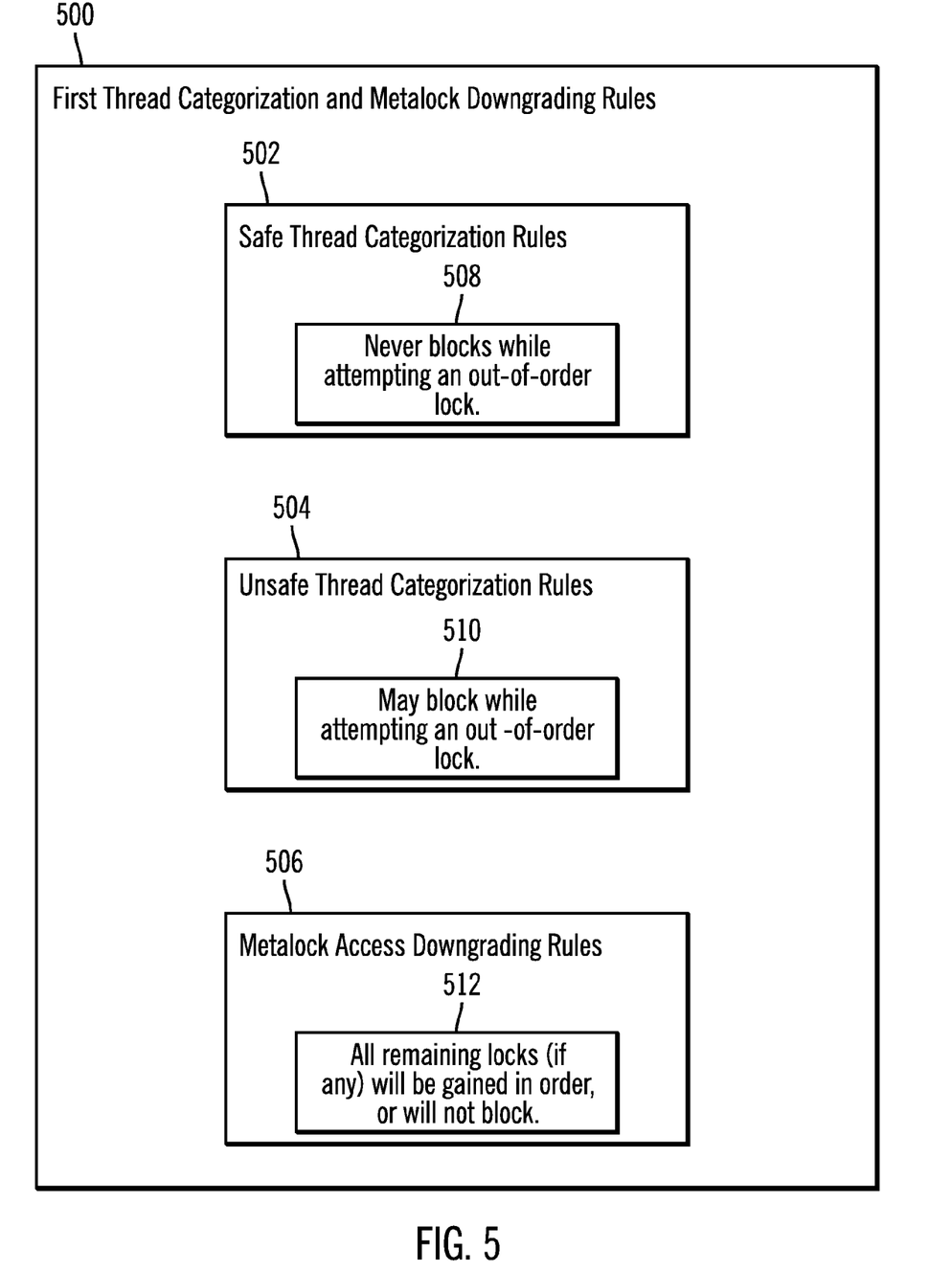
FIG. 5 illustrates first thread categorization and metalock downgrading rules, in accordance with certain embodiments.

FIG. 5 illustrates first thread categorization and metalock downgrading rules 500, in accordance with certain embodiments. The first thread categorization and metalock downgrading rules 500 may be implemented in the deadlock prevention application 108 included in the computational device 102. The first thread categorization and metalock downgrading rules 500 includes safe thread categorization rules 502, dangerous thread categorization rules 504, and metalock access downgrading rules 506.

The safe thread categorization rules 502 includes a rule 508 that indicates that safe threads never block while attempting an out-of-order lock. The dangerous thread categorization rules 504 includes a rule 510 that indicates that dangerous threads may block while attempting an out-of-order lock. The metalock access downgrading rules 506 may include a rule 512 that indicates that a dangerous thread may be downgraded to be a safe thread whenever the thread knows that all remaining locks (if any) will be gained in order, or will not block. Future locks are only considered "in order" if, at the time such future locks are attempted by a thread, the future locks are later in the ordering of locks than any other locks currently held by the thread. For instance, if there are a set of locks ABCDEF, and a thread locks them in the order ACEBDF the thread must consider itself dangerous until the thread completes the D lock, since the thread is attempting to lock D while the thread holds E.

Therefore, FIG. 5 illustrates certain embodiments in which a safe thread is defined such that that the thread never blocks while attempting an out-of-order lock. This can be simply ensured by locking the locks in order; or, if the locks are locked out of order, then the thread uses "try and backoff." If the "try" fails, then the thread may have to unlock all existing data locks and start over. The thread does have to unlock the metalock, however. A thread may be considered safe if the thread uses "try"s on all of its out-of-order locks (unlocking all of the data locks of the thread if a try fails), even if the thread blocks on its in-order locks.

The definition of safety illustrated in FIG. 5 may be used when the vast majority of threads can lock their locks in order, and there is a small minority of threads which cannot. Or, the definition of safety illustrated in FIG. 5 may be used in cases when many threads would need to make exclusive locks.

Figure 6:
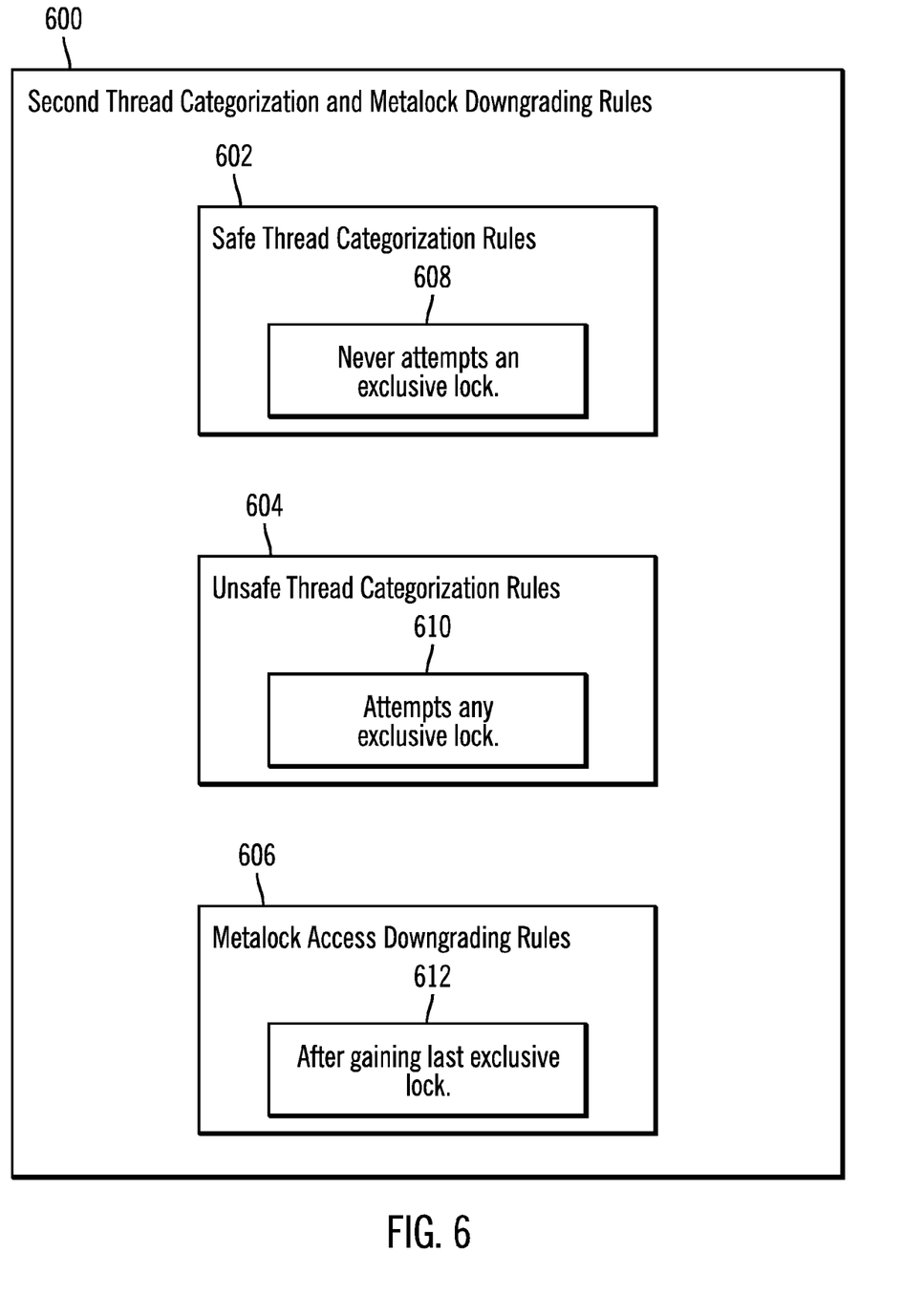
FIG. 6 illustrates second thread categorization and metalock downgrading rules, in accordance with certain embodiments.

FIG. 6 illustrates second thread categorization and metalock downgrading rules 600, in accordance with certain embodiments. The second thread categorization and metalock downgrading rules 600 may be implemented in the deadlock prevention application 108 included in the computational device 102. The second thread categorization and metalock downgrading rules 600 includes safe thread categorization rules 602, dangerous thread categorization rules 604, and metalock access downgrading rules 606.

The safe thread categorization rules 602 includes a rule 608 that indicates that safe threads never attempt an exclusive lock. The dangerous thread categorization rules 604 includes a rule 610 that indicates that dangerous threads may attempt any exclusive lock. The metalock access downgrading rules 606 may include a rule 612 that indicates that a dangerous thread may be downgraded to be a safe thread after gaining the last exclusive lock.

Therefore, FIG. 6 illustrates certain embodiments in which a safe thread is defined to be a thread that never attempts an exclusive lock. In this context, a dangerous thread is a thread which attempts any exclusive lock. A dangerous thread may be downgraded to be a safe thread after the dangerous thread has gained for itself the last exclusive lock.

At any given time, there is at most one thread which both owns one or more exclusive locks and is blocked on some lock (this one thread is the downgraded thread). The lock that the thread is blocked on must be owned by some thread which already has all of its locks; this lock will eventually be released (or downgraded), and so this thread will eventually unblock. All other threads which block must be threads which do not hold any exclusive locks; they will eventually unblock, when the locks that they are blocking on are unlocked or downgraded. Thus, all threads are guaranteed to eventually complete their locks.

This definition of safety illustrated in FIG. 6 may be used when the vast majority of threads use only shared locks, and there is a small minority which uses exclusive locks.

Figure 7:
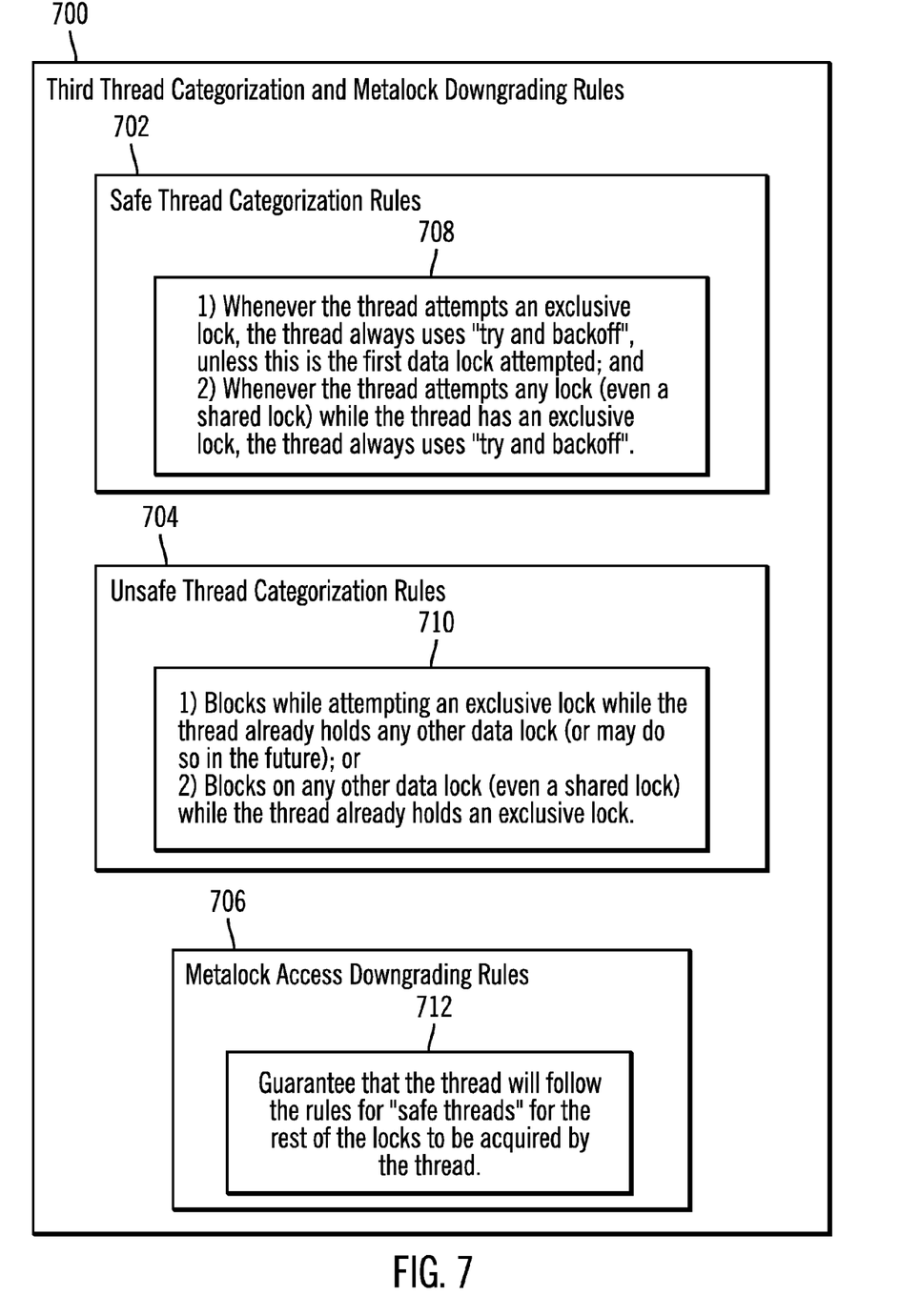
FIG. 7 illustrates third thread categorization and metalock downgrading rules, in accordance with certain embodiments.

FIG. 7 illustrates third thread categorization and metalock downgrading rules 700, in accordance with certain embodiments. The first thread categorization and metalock downgrading rules 700 may be implemented in the deadlock prevention application 108 included in the computational device 102. The first thread categorization and metalock downgrading rules 700 includes safe thread categorization rules 702, dangerous thread categorization rules 704, and metalock access downgrading rules 706.

The safe thread categorization rules 702 includes a rule 708 that indicates the following:
1) Whenever the thread attempts an exclusive lock, the thread always uses "try and backoff", unless this is the first data lock attempted; and
2) Whenever the thread attempts any lock (even a shared lock) while the thread has an exclusive lock, the thread always uses "try and backoff".

The dangerous thread categorization rules 704 includes a rule 710 that indicates that dangerous threads may block while attempting an exclusive lock while the thread already holds any other data lock (or may do so in the future); or a dangerous thread may block on any other data lock (even a shared lock) while the thread already holds an exclusive lock.

The metalock access downgrading rules 706 may include a rule 712 that guarantees that the thread will follow the rules for "safe threads" for the rest of the locks to be acquired by the thread.

Therefore FIG. 7 illustrates another way to define a safe thread that is an extension of the definitions provided in FIG. 6. In FIG. 7, as in FIG. 6, a thread which only attempts shared locks is safe. However, in this definition of safe thread in FIG. 7, thread that attempts exclusive locks can also be safe if it obeys both of the following conditions:
1) Whenever a thread attempts an exclusive lock, the thread always uses "try and backoff", unless this is the data lock attempted;
2) Whenever a thread attempts a lock (even a shared lock) while the thread has an exclusive lock, the thread always uses "try and backoff."

In FIG. 7, a "dangerous" thread is a thread which either;
1) Blocks while attempting an exclusive lock while it already holds any other data lock (or may do so in the future);
2) Blocks on any other data lock (even a shared lock) while it already holds an exclusive lock.

A "dangerous" thread may be downgraded to "safe" whenever it can be guaranteed that the thread will follow the "safe" rules above for the rest of the locks acquired by the thread. This means that the thread has released (or downgraded) any exclusive locks that the thread formerly held. This is because the thread cannot downgrade the metalock until the thread meets the qualifications for a safe thread—and if the thread still holds any exclusive locks, then it means that the thread must "try and backoff" on all future locks. In that case, the thread could just as well release the metalock altogether.

Any time that a thread (other than a dangerous thread) blocks on a lock, it is known that the thread holds no exclusive locks, and that the thread must be trying to get a shared lock on the current data lock of the thread. Thus, if the thread blocks, the thread is blocking on a lock held in exclusive mode. The thread which owns that lock either already has all of its locks, or else that thread is using "try and backoff" on all of its future locks. Thus, the thread which currently holds the exclusive lock in question will either finish its work (and release all locks) or fail a "try" (and likewise release all locks). Thus, the thread which is currently blocked will certainly get its lock at some time in the future.

If there are lots of threads which will require one or more exclusive locks, then the definitions provided in FIG. 6 will experience a lot of serialization as these threads wait for the metalock. This, more flexible, definition of safety in FIG. 7 allows those threads to use shared locks instead. However, it can waste performance as threads do "busy waiting" while the thread waits for data locks to get unlocked.

Figure 8:
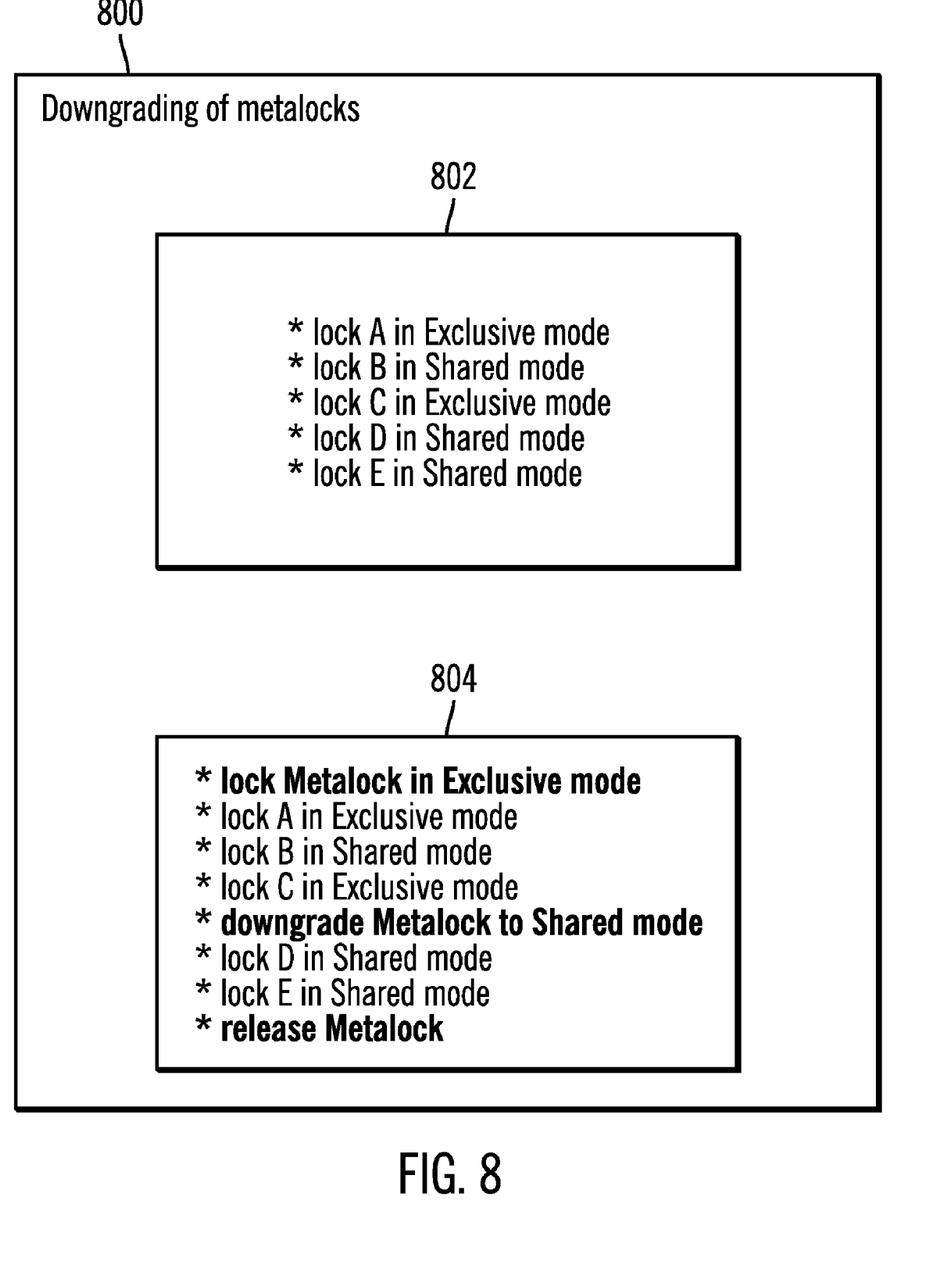
FIG. 8 illustrates downgrading of metalocks, in accordance with certain embodiments.

FIG. 8 illustrates downgrading of metalocks 800, in accordance with certain embodiments. Downgrading is used to atomically move the metalock from "exclusive" to "shared" state. When this happens, there is never a moment when the metalock is released (which means that it is impossible for any other dangerous thread to grab the lock). Additionally, the thread does not release any data locks.

FIG. 8 illustrates a scenario for the downgrading of metalocks (reference numeral 800). A set of data locks are protected by a metalock, and the "safe" rule is as described in FIG. 6. An exemplary thread performs the following data locks (reference numeral 802):
1) lock A in Exclusive mode;
2) lock B in Shared mode;
3) lock C in Exclusive mode;
4) lock D in Shared mode;
5) lock E in Shared mode.

In certain embodiments to prevent deadlocks metalock actions could be inserted (reference numeral 804) as follows:
1) lock Metalock in Exclusive mode
2) lock A in Exclusive mode
3) lock B in Shared mode
4) lock C in Exclusive mode
5) downgrade Metalock to Shared mode
6) lock D in Shared mode
7) lock E in Shared mode
8) release Metalock The above sequence is deadlock-free because the thread holds the metalock in shared mode while attempting exclusive data locks. The thread can downgrade the metalock to shared mode once the thread gains the last of these locks.

Certain embodiments use a lock to prevent against deadlock (this lock is referred to as a "metalock" or a "deadlock prevention mode indicator"). However, rather than using a mutex, certain embodiments uses a multimode lock. Threads which are performing locks in some sort of "safe" manner gain the metalock in shared mode. Thus, any number of threads can be attempting "safe" locks at the same time. If a thread is performing one or more "dangerous" locks, then the thread must gain the metalock in exclusive mode, thereby ensuring that no other threads are attempting locks at the same time. Finally, threads which have performed some "dangerous" locks may later downgrade the metalock to a shared lock, if the threads can guarantee that all of their future locks (if any) will be "safe" locks.

Thus, this invention allows there to be a high level of concurrency even in the locking process. The invention makes the assumption that a majority of the threads in the system will be performing "safe" locks and can thus lock the metalock in shared mode. If such threads block waiting for some thread, other "safe" threads may gain the metalock and perform some locks in the meantime. Thus, high concurrency is maintained in the vast majority of situations.

There are many possible definitions of what constitutes "safe" locks. A particular embodiment must choose one definition and use it consistently with all threads and all locks. Embodiments can choose which definition gives the highest likelihood of good concurrency. This disclosure describes three exemplary definitions of safety.

In certain embodiments, it may be possible to arrange "trees" of metalocks, where there are multiple, non-overlapping groups of data locks, each group protected by the metalock, and groups of metalocks are likewise protected by other, higher-level metalocks.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
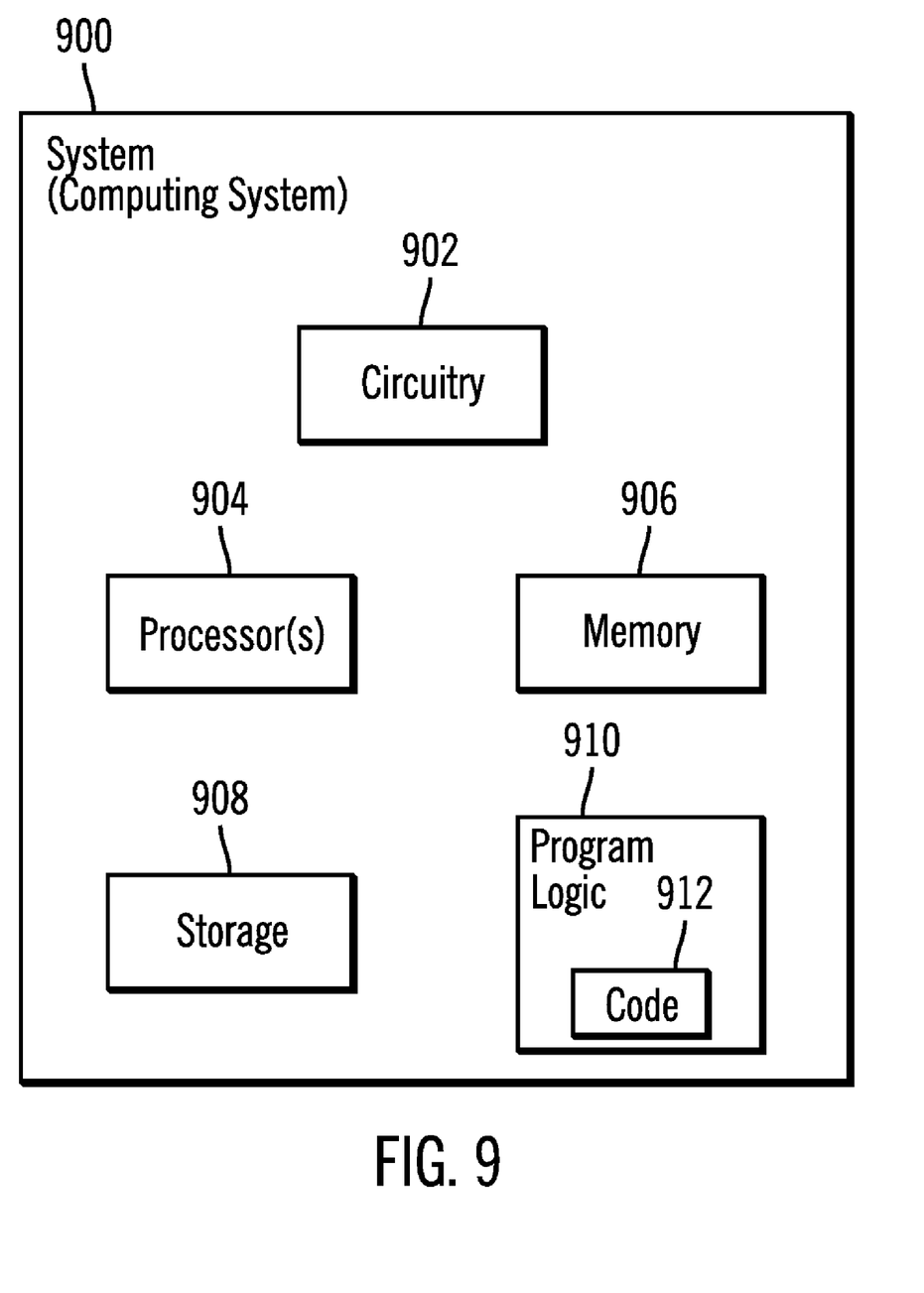
FIG. 9 illustrates a block diagram of a computer architecture in which certain described embodiments are implemented.

FIG. 9 illustrates the architecture of computing system 900, wherein in certain embodiments the computational device 102 of the computing environment 100 of FIG. 1 may be implemented in accordance with the architecture of the computing system 900. The computing system 900 may also be referred to as a system, and may include a circuitry 902 that may in certain embodiments include a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   providing a deadlock prevention mode indicator, wherein the deadlock prevention mode indicator can be held in a shared mode or in an exclusive mode by one or more of a plurality of threads, wherein the plurality of threads can cause deadlocks while acquiring a plurality of data locks; and
   serializing, an execution of the plurality of threads, by allowing a data lock to be acquired by a thread in response to the thread holding the deadlock prevention mode indicator, wherein serializing the plurality of threads avoids any deadlock from occurring; and
   downgrading the deadlock prevention mode indicator from the exclusive mode to the shared mode, in response to determining from downgrading rules that the deadlock prevention mode indicator can be safely downgraded, wherein the downgrading further comprises atomically moving the deadlock prevention mode indicator from the exclusive mode to the shared mode, and wherein the serializing further comprises:
   determining, whether the thread is of a safe thread type or an unsafe thread type, wherein safe threads are those threads that never block while attempting an out of order data lock, and wherein unsafe threads may block while attempting an out of order data lock;
   in response to determining that the thread is of the safe thread type, and determining that the deadlock prevention mode indicator is not being held in exclusive mode by another thread, acquiring the deadlock prevention mode indicator in a shared mode;
   in response to determining that the thread is of the unsafe thread type, and determining that the deadlock prevention mode indicator is not being held by another thread, acquiring the deadlock prevention mode indicator in an exclusive mode.

2. The method of claim 1, wherein the deadlock prevention mode indicator does not protect any data, and wherein a data lock of the plurality of data locks represents a resource that needs to be locked by one thread included in the plurality of threads.

3. The method of claim 1, wherein subsequent to acquiring the deadlock prevention mode indicator, performing:
   initiating acquisition of a selected data lock of the plurality of data locks;
   determining whether some other thread owns the selected data lock in a conflicting state;
   acquiring the selected data lock in response to determining that no other thread owns the selected data lock in the conflicting state; and
   releasing the deadlock prevention mode indicator, when no other additional data locks are needed.

4. A system, comprising:
   memory; and
   processor coupled to the memory, wherein the processor performs operations, the operations comprising:
   maintaining a deadlock prevention mode indicator, wherein the deadlock prevention mode indicator can be held in a shared mode or in an exclusive mode by one or more of a plurality of threads, and wherein the plurality of threads can cause deadlocks while acquiring a plurality of data locks; and
   serializing, an execution of the plurality of threads, by allowing a data lock to be acquired by a thread in response to the thread holding the deadlock prevention mode indicator, wherein serializing the plurality of threads avoids any deadlock from occurring; and
   downgrading the deadlock prevention mode indicator from the exclusive mode to the shared mode, in response to determining from downgrading rules that the deadlock prevention mode indicator can be safely downgraded, wherein the downgrading further comprises atomically moving the deadlock prevention mode indicator from the exclusive mode to the shared mode, and wherein the serializing further comprises:
   determining, whether the thread is of a safe thread type or an unsafe thread type, wherein safe threads are those threads that never block while attempting an out of order data lock, and wherein unsafe threads may block while attempting an out of order data lock;
   in response to determining that the thread is of the safe thread type, and determining that the deadlock prevention mode indicator is not being held in exclusive mode by another thread, acquiring the deadlock prevention mode indicator in a shared mode;
   in response to determining that the thread is of the unsafe thread type, and determining that the deadlock prevention mode indicator is not being held by another thread, acquiring the deadlock prevention mode indicator in an exclusive mode.

5. The system of claim 4, wherein the deadlock prevention mode indicator does not protect any data, and wherein a data lock of the plurality of data locks represents a resource that needs to be locked by one thread included in the plurality of threads.

6. The system of claim 4, wherein subsequent to acquiring the deadlock prevention mode indicator, performing:
   initiating acquisition of a selected data lock of the plurality of data locks;
   determining whether some other thread owns the selected data lock in a conflicting state;
   acquiring the selected data lock in response to determining that no other thread owns the selected data lock in the conflicting state; and
   releasing the deadlock prevention mode indicator, when no other additional data locks are needed.

7. A storage device, wherein code stored in the storage device when executed by a computer causes operations, the operations comprising:
   providing a deadlock prevention mode indicator, wherein the deadlock prevention mode indicator can be held in a shared mode or in an exclusive mode by one or more of a plurality of threads, and wherein the plurality of threads can cause deadlocks while acquiring a plurality of data locks; and
   serializing, an execution of the plurality of threads, by allowing a data lock to be acquired by a thread in response to the thread holding the deadlock prevention mode indicator, wherein serializing the plurality of threads avoids any deadlock from occurring; and
   downgrading the deadlock prevention mode indicator from the exclusive mode to the shared mode, in response to determining from downgrading rules that the deadlock prevention mode indicator can be safely downgraded, wherein the downgrading further comprises atomically moving the deadlock prevention mode indicator from the exclusive mode to the shared mode, and wherein the serializing further comprises:
   determining, whether the thread is of a safe thread type or an unsafe thread type, wherein safe threads are those threads that never block while attempting an out of order data lock, and wherein unsafe threads may block while attempting an out of order data lock;
   in response to determining that the thread is of the safe thread type, and determining that the deadlock prevention mode indicator is not being held in exclusive mode by another thread, acquiring the deadlock prevention mode indicator in a shared mode;
   in response to determining that the thread is of the unsafe thread type, and determining that the deadlock prevention mode indicator is not being held by another thread, acquiring the deadlock prevention mode indicator in an exclusive mode.

8. The storage device of claim 7, wherein the deadlock prevention mode indicator does not protect any data, and wherein a data lock of the plurality of data locks represents a resource that needs to be locked by one thread included in the plurality of threads.

9. The storage device of claim 7, wherein subsequent to acquiring the deadlock prevention mode indicator, performing:
   initiating acquisition of a selected data lock of the plurality of data locks;
   determining whether some other thread owns the selected data lock in a conflicting state;
   acquiring the selected data lock in response to determining that no other thread owns the selected data lock in the conflicting state; and
   releasing the deadlock prevention mode indicator, when no other additional data locks are needed.

10. A method for deploying computing infrastructure, comprising integrating computer-readable code into a computer, wherein the code in combination with the computer is capable of performing:
    providing a deadlock prevention mode indicator, wherein the deadlock prevention mode indicator that can be held in a shared mode or in an exclusive mode by one or more of a plurality of threads, and wherein the plurality of threads can cause deadlocks while acquiring a plurality of data locks; and
    serializing, an execution of the plurality of threads, by allowing a data lock to be acquired by a thread in response to the thread holding the deadlock prevention mode indicator, wherein serializing the plurality of threads avoids any deadlock from occurring; and
    downgrading the deadlock prevention mode indicator from the exclusive mode to the shared mode, in response to determining from downgrading rules that the deadlock prevention mode indicator can be safely downgraded, wherein the downgrading further comprises atomically moving the deadlock prevention mode indicator from the exclusive mode to the shared mode, and wherein the serializing further comprises:
    determining, whether the thread is of a safe thread type or an unsafe thread type, wherein safe threads are those threads that never block while attempting an out of order data lock, and wherein unsafe threads may block while attempting an out of order data lock;
    in response to determining that the thread is of the safe thread type, and determining that the deadlock prevention mode indicator is not being held in exclusive mode by another thread, acquiring the deadlock prevention mode indicator in a shared mode;
    in response to determining that the thread is of the unsafe thread type, and determining that the deadlock prevention mode indicator is not being held by another thread, acquiring the deadlock prevention mode indicator in an exclusive mode.

11. The method for deploying computing infrastructure of claim 10, wherein the deadlock prevention mode indicator does not protect any data, and wherein a data lock of the plurality of data locks represents a resource that needs to be locked by one thread included in the plurality of threads.

12. The method for deploying computing infrastructure of claim 10, wherein subsequent to acquiring the deadlock prevention mode indicator, performing:
    initiating acquisition of a selected data lock of the plurality of data locks;
    determining whether some other thread owns the selected data lock in a conflicting state;
    acquiring the selected data lock in response to determining that no other thread owns the selected data lock in the conflicting state; and
    releasing the deadlock prevention mode indicator, when no other additional data locks are needed.

* * * * *